United States Patent
Poplin et al.

(10) Patent No.: US 6,477,203 B1
(45) Date of Patent: Nov. 5, 2002

(54) SIGNAL PROCESSING DISTRIBUTED ARITHMETIC ARCHITECTURE

(75) Inventors: Dwight Poplin, Corvallis, OR (US); Jonathan S. Gibson, Aurora, OR (US)

(73) Assignee: Agilent Technologies, Inc., Palo Alto, CA (US)

(*) Notice: Subject to any disclaimer, the term of this patent is extended or adjusted under 35 U.S.C. 154(b) by 0 days.

(21) Appl. No.: 09/183,196

(22) Filed: Oct. 30, 1998

(51) Int. Cl.[7] .......................... H04B 1/66; G06F 17/14; G06F 7/32; G06F 7/52
(52) U.S. Cl. .................... 375/240.2; 708/402; 708/520; 708/620
(58) Field of Search .................. 375/240.2, 240.16, 375/245; 382/302, 303, 304, 305; 708/402, 520, 620

(56) References Cited

U.S. PATENT DOCUMENTS

| | | | |
|---|---|---|---|
| 4,864,529 A | 9/1989 | Shah et al. | 364/760 |
| 5,117,385 A | 5/1992 | Gee | 364/757 |
| 5,226,002 A | 7/1993 | Wu et al. | 364/754 |
| 5,257,389 A | * 10/1993 | Liu et al. | 382/305 |
| RE34,562 E | * 3/1994 | Murakami et al. | 375/245 |
| 5,483,475 A | 1/1996 | Kao | 364/725 |
| 5,740,095 A | 4/1998 | Parant | 364/760 |
| 6,148,034 A | * 11/2000 | Lipovski | 375/240.16 |

OTHER PUBLICATIONS

White, IEEE ASSP Magazine Jul. 1989, Applications of Distributed Arithmetic to Digital Signal Processing:A Tutorial Review.

White, Stanley A., Applications of Distributed Arithmetic to Digital Signal Processing: A Tutorial Review, IEEE ASSP Magazine, Jul. 1989, pp 4–19.

* cited by examiner

*Primary Examiner*—Chris Kelley
*Assistant Examiner*—Allen Wong

(57) ABSTRACT

An apparatus computes an inner product vector of a matrix and a vector. The matrix has a first set of coefficients and the vector has a second set of coefficients. At least one input register is used to store the second set of coefficients. A plurality of storage elements are used to store partial sums that are pre-calculated from the first set of coefficients of the matrix. The outputs of the at least one input register are used as the address inputs to the plurality of storage elements to select a subset of the partial sums. In addition, a select circuit is coupled to the storage elements' address lines to determine which row in the matrix the vector forms one element of the resultant inner product for that row. The subset of partial sums from the outputs of the storage elements are added in an adder circuit to create a summation output that presents the element of the inner product vector of the matrix multiplied by the vector. The apparatus has the advantages of reduced integrated circuit area and the ability to create elements of the inner product vector in any desired order.

21 Claims, 5 Drawing Sheets

SIGNAL PROCESSING DISTRIBUTED ARITHMETIC ARCHITECTURE

FIELD OF THE INVENTION

The invention relates to signal processing. More specifically, the invention relates to a new apparatus and method implementing a new Distributed Arithmetic architecture for creating an inner product of a vector and a matrix and having a particularly useful application in a digital camera and similar image processing applications.

BACKGROUND OF THE INVENTION

As consumers become more comfortable with digital devices such as compact disks, computers, printers, and cell phones, they are more willing to accept digitally enabled technology in other areas of their lives, such as photography. Indeed, the current trend in photography is toward digital photography that eliminates the requirement for film and instead uses digital storage devices in place of the film to hold the pictures users have taken. However, the cost of digital cameras still remain outside the reach of most people and efforts are being taken to bring the cost down in order to allow for mass acceptance. In addition to lowering costs, in order to increase the demand for digital cameras, the image quality of the pictures must be comparable with that of a typical film based photo. This image quality is driven by increasing the number of pixels (the light-to-electricity converters) used in the image sensor within the digital camera. Unfortunately, this increase in the number of pixels further drives up the cost of the digital camera due to the increased processing demands required to convert the image captured on the image sensor into an acceptable digital format that can fit within the limits of the digital storage device used in the camera. In order to allow an acceptable number of pictures to be taken with a digital camera and stored within it, some form of image compression is necessary to reduce the storage requirements.

Naturally, users are also demanding new features to take advantage of the digital properties of the pictures they have taken. For example, rather than correct for color balance, light levels, contrast, etc. on a personal computer after a set of photographs have been taken, the users wish to have these operations performed automatically on the camera itself so the pictures can be reproduced directly on a color printer, thus bypassing the personal computer entirely.

Therefore, to enable the digital photography market, the cost of a digital camera must be reduced while adding additional functionality. This new digital camera requires that the electronics within it be versatile enough to provide the additional functionality. In addition, the electronics must require less integrated circuit area so that costs are decreased.

Some previous attempts to reduce size and cost of image processing circuits have focused on Distributed Arithmetic methods. Distributed Arithmetic (DA) gets its name because the arithmetic functions are distributed among various electronic devices in a non-conventional sense, rather than in discrete arithmetic blocks that are coupled together (e.g. addition, multiplication). In image processing, the most encountered form of arithmetic is multiplying a vector (a portion of the image) and a matrix (a transform function, such as image compression or expansion) to form an inner product. Fortunately, this inner product arithmetic is performed most efficiently by DA. In fact, previous DA methods have been successful in reducing the number of transistors used in an image processing integrated circuit by at least 50–80% over previous conventional architectures. However, the continuing need to reduce cost while providing still more functionality requires that a new DA method be implemented to further reduce the number of transistors in image processing circuits.

SUMMARY OF THE DISCLOSURE

An apparatus computes an inner product vector of a matrix and a vector. The matrix has a first set of coefficients and the vector has a second set of coefficients. At least one input register is used to store the second set of coefficients. A plurality of storage elements are used to store partial sums that are pre-calculated from the first set of coefficients of the matrix. The outputs of the at least one input register are used as the address inputs to the plurality of storage elements to select a subset of the partial sums. In addition, a select circuit is coupled to the storage elements' address lines to determine which row in the matrix the vector forms one element of the resultant inner product vector. The subset of partial sums from the outputs of the storage elements are added in an adder circuit to create a summation output that presents the element of the inner product vector of the matrix multiplied by the vector.

DETAILED DESCRIPTION OF THE PREFERRED EMBODIMENT

Figure 1:
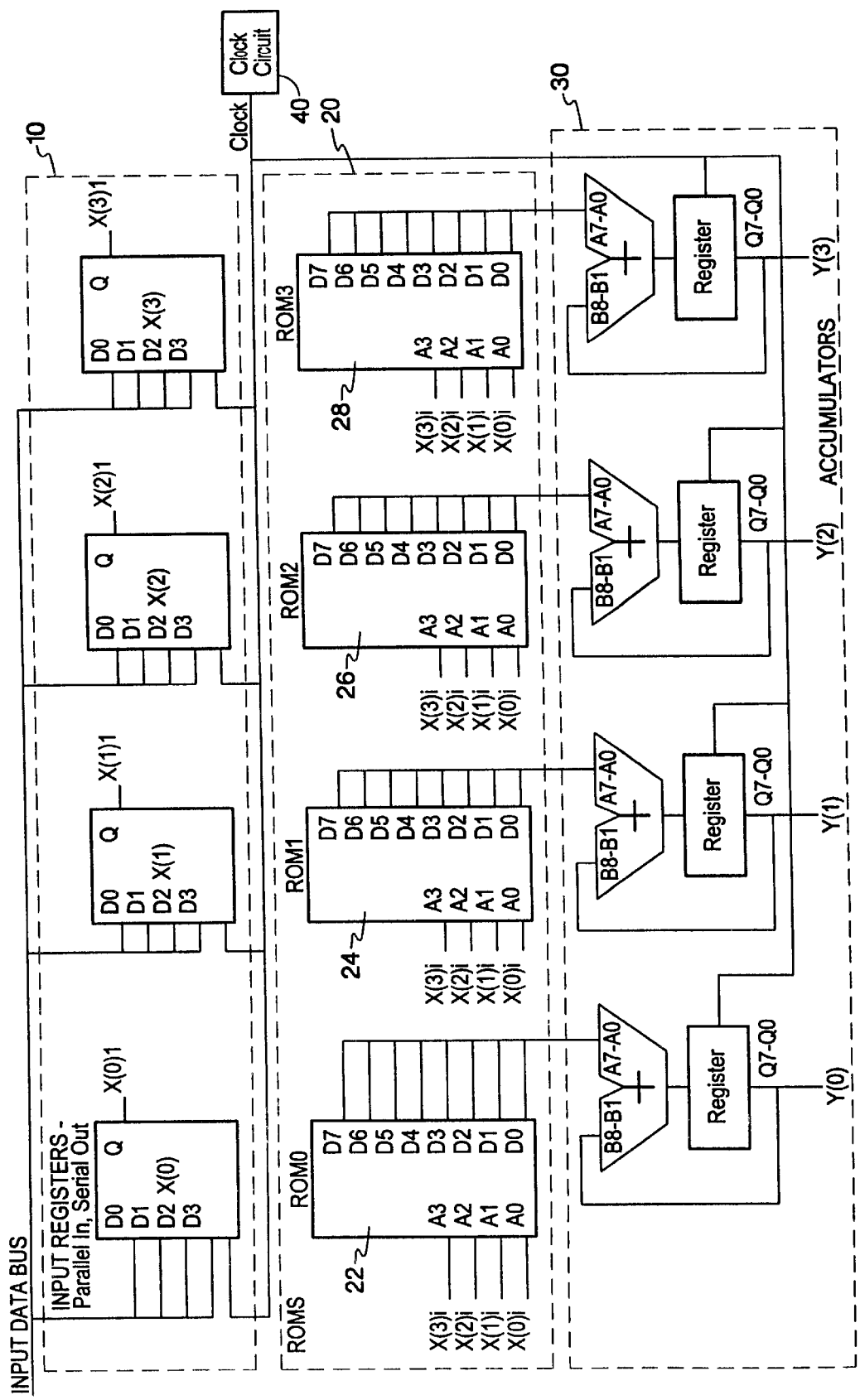
FIG. 1 illustrates a conventional implementation of a Distributed Arithmetic method to perform an inner product.

Before describing the preferred embodiment of the invention, it is helpful to understand the approach used in a conventional Distributed Arithmetic (DA) method (see U.S. Pat. No. 5,226,002) to multiply a vector by a matrix. To illustrate the conventional DA method, consider multiplying an N=4 element column vector $\vec{X}$ with a 4 row×4 column matrix of coefficients $C_{ij}$, C to form a resultant vector $\vec{Y}$ consisting of N elements, where:

N=number of inputs of vector $\vec{X}$ and $\vec{Y}$ where $$\vec{X} = \sum_{i=0}^{N-1} X(i) \text{ and } \vec{Y} = \sum_{i=0}^{N-1} Y(i)$$

$$\begin{bmatrix} Y(0) \\ Y(1) \\ Y(2) \\ Y(3) \end{bmatrix} = \begin{bmatrix} C_{00} & C_{01} & C_{02} & C_{03} \\ C_{10} & C_{11} & C_{12} & C_{13} \\ C_{20} & C_{21} & C_{22} & C_{23} \\ C_{30} & C_{31} & C_{32} & C_{33} \end{bmatrix} \begin{bmatrix} X(0) \\ X(1) \\ X(2) \\ X(3) \end{bmatrix}$$

In digital circuits, numbers are represented in binary form. Thus, each element of the vector $\vec{X}$ can be written as a row of bits which is a two's compliment binary representation of the value of the elements of $\vec{X}$. Those skilled in the art will appreciate that other binary representations for the value of the elements of $\vec{X}$ exist and still meet the spirit and scope of the invention. Those skilled in the art will also appreciate that each element of $\vec{X}$ can be represented with a number of bits, b, required for a given precision as desired for the application the user wishes to implement and still meet the spirit and scope of the invention. By way of example, assume each element of vector $\vec{X}$ is 4 (e.g. b=4) bits wide, the elements of vector $\vec{X}$ can be represented by:

$X(i) = \Sigma_{j=0}^{b-1} X(i)_j 2^j$ for example, when i=0 then $X(i) = X(0)_3 2^3 + X(0)_2 2^2 + X(0)_1 2^1 + X(0)_0 2^0$ therefore, the above multiplication of vector $\vec{X}$ with matrix C can be written as:

$$\begin{bmatrix} Y(0) \\ Y(1) \\ Y(2) \\ Y(3) \end{bmatrix} = \begin{bmatrix} C_{00} & C_{01} & C_{02} & C_{03} \\ C_{10} & C_{11} & C_{12} & C_{13} \\ C_{20} & C_{21} & C_{22} & C_{23} \\ C_{30} & C_{31} & C_{32} & C_{33} \end{bmatrix} \begin{bmatrix} X(0)_3 2^3 & X(0)_2 2^3 & X(0)_1 2^1 & X(0)_0 2^0 \\ X(1)_3 2^3 & X(1)_2 2^3 & X(1)_1 2^1 & X(1)_0 2^0 \\ X(2)_3 2^3 & X(2)_2 2^3 & X(2)_1 2^1 & X(2)_0 2^0 \\ X(3)_3 2^3 & X(3)_2 2^3 & X(3)_1 2^1 & X(3)_0 2^0 \end{bmatrix}$$

where $X(i)_j$ is the $j$th bit of $X(i)$, bit 0 being the least significant bit. Since the elements ($X(i)_j$) of vector $\vec{X}$ are bits, they can only have a value of one or zero. Therefore, the inner product of any column in $\vec{X}$ with a given row in matrix C can only have 16 possible values. These 16 values represent all possible sums of the elements (coefficients) of the given row vector. The basic idea behind the conventional DA method was to derive and pre-calculate these partial sums for the row vector and store these partial sums in a separate ROM (read only memory) for each row of C. Each column vector of $\vec{X}$ was applied, one at a time, to each separate ROM's address inputs and each ROM's output was accumulated to produce the resultant $\vec{Y}$ vector.

Figure 1A:
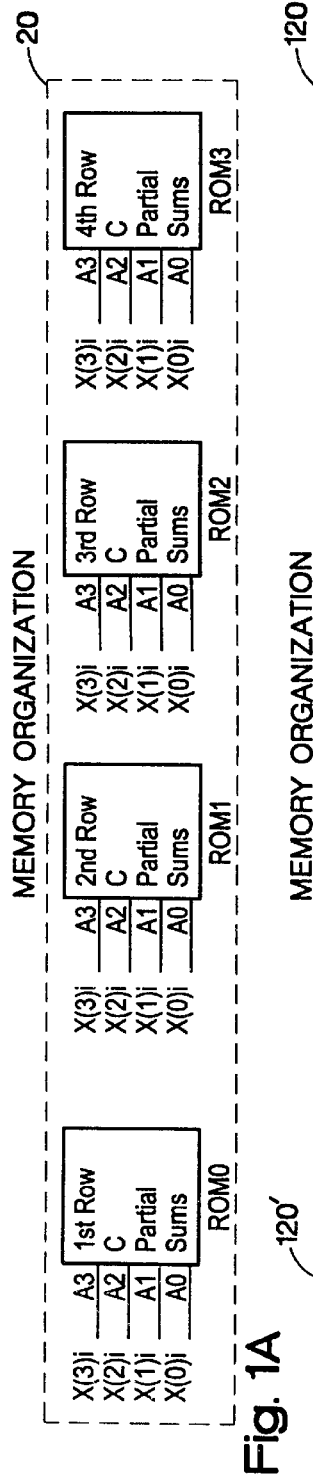
FIG. 1A illustrates the memory organization used in the conventional implementation of FIG. 1.

FIG. 1 illustrates a conventional circuit which calculates Y(0) through Y(3) using the conventional DA method. It consists of 4 input registers 10 comprised of parallel-in serial-out shift registers, 4 ROM's 20, 4 accumulators 30 and a clock circuit 40. To begin the calculation the inputs coefficients, X(0) through X(3), are clocked into the input registers 10. These input registers 10 clock out one bit of each input (essentially the columns of $\vec{X}$) on each cycle, beginning with the least significant bit. These bits together form the address to the ROMs 20. As shown in FIG. 1A, each ROM shares the same address inputs, but each ROM has different pre-calculated partial sums of data stored inside the ROM. ROM0 22 has the pre-calculated partial sums of row 0 of the matrix C, ROM1 24 has the pre-calculated partial sums from row 1, ROM2 26 has the pre-calculated partial sums of row 2, and ROM3 28 has the pre-calculated partial sums of row 3. On each clock cycle, an address is presented to the ROMs 20 from the input registers 10 and a new data word is clocked out of each ROM. The output of each ROM is shown as being 8 bits wide. Those skilled in the art will appreciate that the data bus can be any bit width depending on the desired resolution of the partial sums for a particular application. The outputs from each of the ROM's are accumulated separately in accumulators 30 and the results, Y(0)–Y(3), appear at the output of the accumulators 30 after all the clock cycles from clock circuit 40 for each row of matrix C have been performed.

Note that FIG. 1 also highlights two important parameters of a DA circuit. The first parameter N, the number of input registers or elements (coefficients) of $\vec{X}$ and $\vec{Y}$, determines the amount of locations required in each ROM, the number of locations being on the order of $2^N$ since there are various techniques known to those skilled in the art for reducing the total number of $2^N$ locations (see White, StanleyA, "Applications of Distributed Arithmetic to Digital Signal Processing: A Tutorial Review", IEEE ASSP Magazine, July 1989, pp 4–19). In FIG. 1, N=4 so each ROM must have at most $2^4$ or 16 locations to store all possible sums of the elements a row vector of matrix C. The second parameter, b, is the number of bits in each of the input registers 10. This second parameter, b, determines the number of clock cycles that are required to produce the resultant vector $\vec{Y}$. In FIG. 1, the input registers are 4 bits wide, so it takes 4 clock cycles to produce the vector $\vec{Y}$.

However, one disadvantage of vector multipliers which use the conventional DA method is that the elements of the vector $\vec{Y}$ are produced in parallel on one clock cycle in each sequence of b clock cycles. In many instances, it is desirable to produce an element of the vector $\vec{Y}$ once each clock cycle so that it can be stored easily or sent to the next stage of pipeline processing. Because the conventional DA method generates all the elements of the vector $\vec{Y}$ on one clock cycle during a sequence of b clock cycles, N additional registers coupled to the accumulator outputs (not shown in FIG. 1) are required to store the results if they are processed one at a time in a pipeline fashion while the conventional DA circuit goes on processing the next set of inputs. In a typical VLSI (very large scale integration) implementation using standard cell methodology, every bit in the register can require as many as 12 gates, so this overhead for N additional registers is substantial.

To illustrate the improved method of the invention over the conventional DA method, consider the inner product of matrix C and vector $\vec{X}$ shown earlier:

$$\begin{bmatrix} Y(0) \\ Y(1) \\ Y(2) \\ Y(3) \end{bmatrix} = \begin{bmatrix} C_{00} & C_{01} & C_{02} & C_{03} \\ C_{10} & C_{11} & C_{12} & C_{13} \\ C_{20} & C_{21} & C_{22} & C_{23} \\ C_{30} & C_{31} & C_{32} & C_{33} \end{bmatrix} \begin{bmatrix} X(0)_3 2^3 & X(0)_2 2^3 & X(0)_1 2^1 & X(0)_0 2^0 \\ X(1)_3 2^3 & X(1)_2 2^3 & X(1)_1 2^1 & X(1)_0 2^0 \\ X(2)_3 2^3 & X(2)_2 2^3 & X(2)_1 2^1 & X(2)_0 2^0 \\ X(3)_3 2^3 & X(3)_2 2^3 & X(3)_1 2^1 & X(3)_0 2^0 \end{bmatrix}$$

The conventional DA circuit performed the inner product for each element of the vector $\vec{Y}$ using one ROM for each element as shown below:

$$Y(0) = \begin{matrix} (C_{00}X(0)_0 + C_{01}X(1)_0 + C_{02}X(2)_0 + C_{03}X(3)_0)2^0 + & \text{1st clock cycle} \\ (C_{00}X(0)_1 + C_{01}X(1)_1 + C_{02}X(2)_1 + C_{03}X(3)_1)2^1 + & \text{2nd clock cycle} \\ (C_{00}X(0)_2 + C_{01}X(1)_2 + C_{02}X(2)_2 + C_{03}X(3)_2)2^2 + & \text{3rd clock cycle} \\ (C_{00}X(0)_3 + C_{01}X(1)_3 + C_{02}X(2)_3 + C_{03}X(3)_3)2^3 & \text{4th clock cycle} \end{matrix} \Big\} \text{1st ROM}$$

$$Y(1) = \begin{matrix} (C_{10}X(0)_0 + C_{11}X(1)_0 + C_{12}X(2)_0 + C_{13}X(3)_0)2^0 + & \text{1st clock cycle} \\ (C_{10}X(0)_1 + C_{11}X(1)_1 + C_{12}X(2)_1 + C_{13}X(3)_1)2^1 + & \text{2nd clock cycle} \\ (C_{10}X(0)_2 + C_{11}X(1)_2 + C_{12}X(2)_2 + C_{13}X(3)_2)2^2 + & \text{3rd clock cycle} \\ (C_{10}X(0)_3 + C_{11}X(1)_3 + C_{12}X(2)_3 + C_{13}X(3)_3)2^3 & \text{4th clock cycle} \end{matrix} \Big\} \text{2nd ROM}$$

Note that the multiplication above of the $2^{jth}$ factor can be performed by simply left shifting the resultant sum in the immediate parenthesis j times. For the conventional circuit, this is done after each clock cycle in the accumulators 30.

The new and improved DA method of the invention performs the same calculations as the conventional DA method, but it performs them in a different order. On the first cycle, it forms the inner product of row 0 of matrix C with each of the columns of vector $\vec{X}$ and adds these inner products together to produce the element Y(0) of vector $\vec{Y}$. It repeats this pattern on every cycle using one row of matrix C together with all of the columns of vector $\vec{X}$ to produce each element of vector $\vec{Y}$. The operation is shown below (Sel0 and Sel1 are address inputs to all the ROMs):

$$Y(0) = \begin{matrix} (C_{00}X(0)_0 + C_{01}X(1)_0 + C_{02}X(2)_0 + C_{03}X(3)_0)2^0 + & \text{ROM0} \\ (C_{00}X(0)_1 + C_{01}X(1)_1 + C_{02}X(2)_1 + C_{03}X(3)_1)2^1 + & \text{ROM1} \\ (C_{00}X(0)_2 + C_{01}X(1)_2 + C_{02}X(2)_2 + C_{03}X(3)_2)2^2 + & \text{ROM2} \\ (C_{00}X(0)_3 + C_{01}X(1)_3 + C_{02}X(2)_3 + C_{03}X(3)_3)2^3 & \text{ROM3} \end{matrix} \Big\} \begin{matrix}\text{1st Clock Cycle} \\ \text{Sel0} = 0 \\ \text{Sel1} = 0\end{matrix}$$

$$Y(1) = \begin{matrix} (C_{10}X(0)_0 + C_{11}X(1)_0 + C_{12}X(2)_0 + C_{13}X(3)_0)2^0 + & \text{ROM0} \\ (C_{10}X(0)_1 + C_{11}X(1)_1 + C_{12}X(2)_1 + C_{13}X(3)_1)2^1 + & \text{ROM1} \\ (C_{10}X(0)_2 + C_{11}X(1)_2 + C_{12}X(2)_2 + C_{13}X(3)_2)2^2 + & \text{ROM2} \\ (C_{10}X(0)_3 + C_{11}X(1)_3 + C_{12}X(2)_3 + C_{13}X(3)_3)2^3 & \text{ROM3} \end{matrix} \Big\} \begin{matrix}\text{2nd Clock Cycle} \\ \text{Sel0} = 1 \\ \text{Sel1} = 0\end{matrix}$$

Note that for the new DA method, the multiplication of $2^j$ can be performed inherently by the wiring of the storage element outputs 120 to the adder circuit 130 such that ROMj's output is shifted left j times and the least significant bits then set to zero.

Additionally, rather than be limited to fixed coefficients by using a static storage element such as a ROM, dynamic methods for changing the coefficients may be considered. One approach is to increase the ROM size to select additional sets of coefficients by the use of address line selection. Another approach is to use dynamically updatable storage elements such as random access memory (RAM), flash, or EEPROM (electrically eraseable programable read only memory) integrated circuits or modules.

Figure 2A:
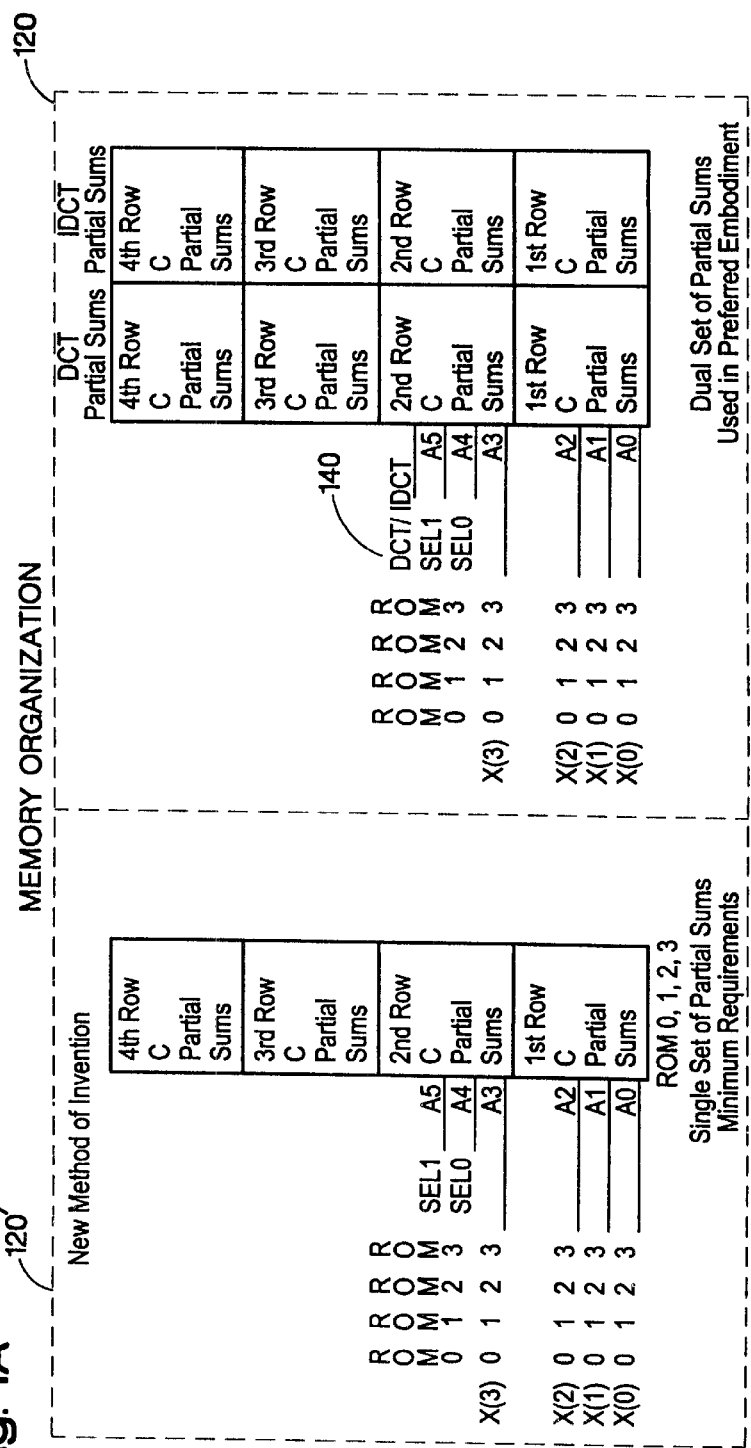
FIG. 2A illustrates the memory organization used in the preferred embodiment of FIG. 2.
Figure 2:
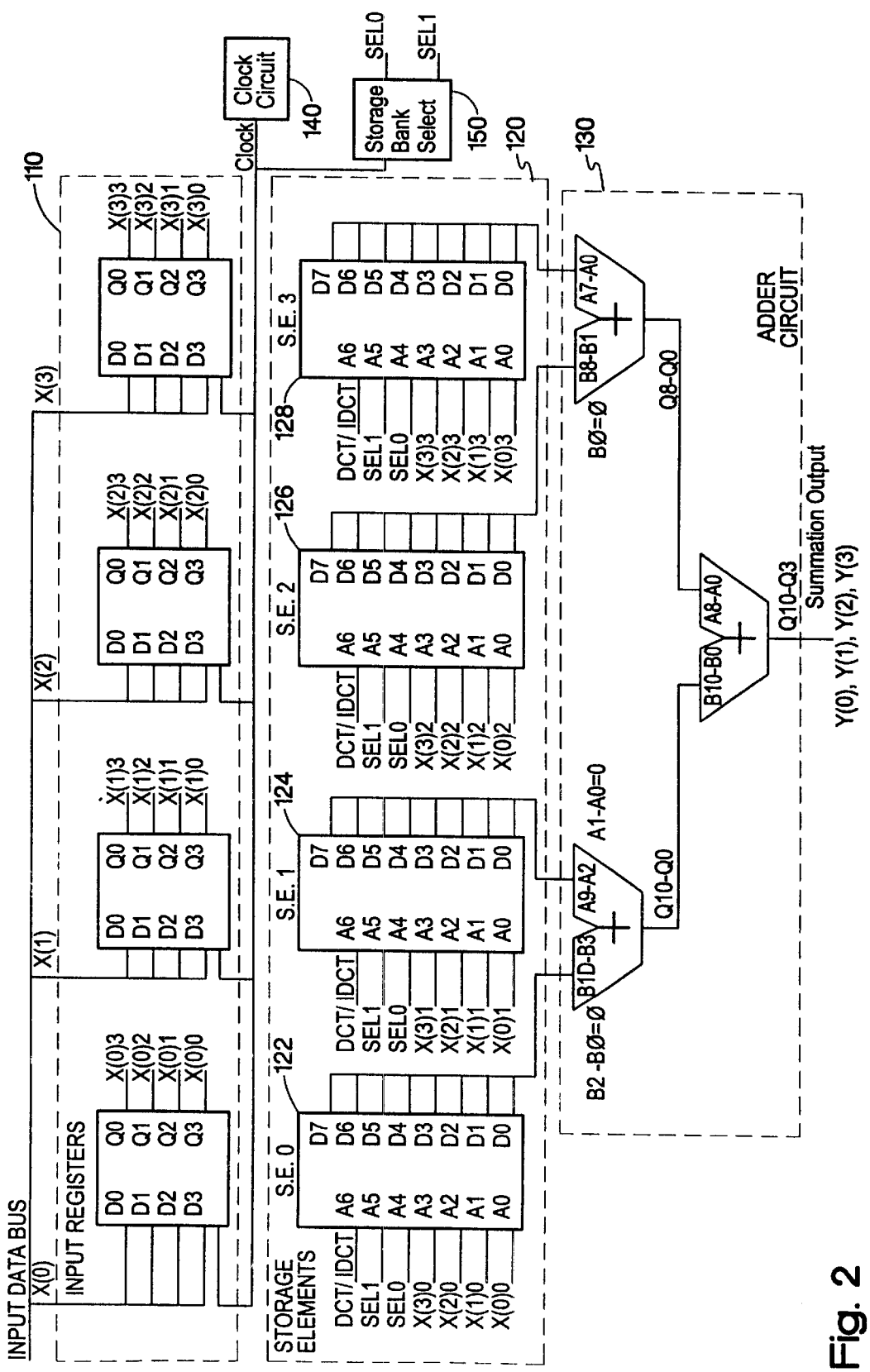
FIG. 2 illustrates the preferred embodiment using the inventive method for Distributed Arithmetic.

FIG. 2 illustrates the preferred embodiment of the invention in a circuit that uses this new method. It consists of N (4) input registers 110 with their outputs coupled to a set of N storage elements 120 address inputs. The storage elements 120 can be comprised of ROM, RAM or other equivalent solid state storage such as registers, flash memory, EEPROM, programmable Read Only Memory (PROM) or a mixture thereof The outputs of the storage elements 120 are coupled to an adder circuit 130 formed of a network of three smaller two addend input adders. Again, those skilled in the art will appreciate that the outputs of the storage elements can be any bit width depending on the desired resolution of the inner product result and still meet the spit and scope of the invention. In the conventional circuit, all the ROMs 20 have the same address input signals coupled to the input register's 10 serial outputs. The input registers' 10 serial outputs presents one column of vector $\vec{X}$ to all the ROMs 20 for each clock cycle. In the improved circuit of the preferred embodiment, all storage elements 120 have unique address inputs. Each storage element receives one of the columns of vector $\vec{X}$ as an address input and these address inputs to the storage elements 120 are held constant throughout the entire calculation of vector $\vec{Y}$. The input to storage element i is the ith column of vector $\vec{X}$, X(0)i–X(3)i. In addition, a storage bank select circuit 150 is shown coupled to the clock circuit 140. For each clock cycle, the storage bank select circuit generates new Sel0 and Sel1 outputs, which are coupled to the address lines of the storage elements 120. These bank select signals, Sel0 and Sel1, are used to change the partial sums used to multiply the chosen row of matrix C with the vector $\vec{X}$.

In the conventional circuit as shown in FIG. 1A, each ROM contains the pre-calculated sums for one of the rows of matrix C. In the improved circuit of the preferred embodiment as shown in FIG. 2A, the contents of all the storage elements 120 are identical. Each storage element contains the pre-calculated partial sums for all rows of matrix C. This requires that the storage elements for the improved circuit have more storage locations than a ROM in the conventional circuit. On the first cycle of the calculation, the upper bits of each storage element's addresses are set such that the sums from row 0 of matrix C are used (e.g. Sel0=0, Sel1=0). The output of the adder network will therefore be Y(0). On the next clock cycle, the pre-calculated sums of row 1 of matrix C are selected in the storage elements 120 (e.g. Sel0=1, Sel1=0) and the adder network produces Y(1). This process is repeated with a different set of pre-calculated sums being selected on each clock cycle by changing Sel0 and Sel1 until all the outputs of vector $\vec{Y}$ are produced.

An additional address input can be added to each storage element of storage elements 120 to double the number of locations and to create a storage element that presents a choice of matrix coefficients such as when only two matrix-vector operations are required, i.e. performing a discrete cosine transform or inverse discrete cosine transform operation. An additional embodiment has the storage elements 120 having at least one RAM or other loadable or re-writeable memory so that the values used for the matrix coefficients (the partial sums as stored in the storage devices) can be dynamically updated rather than be statically fixed.

Figure 2B:
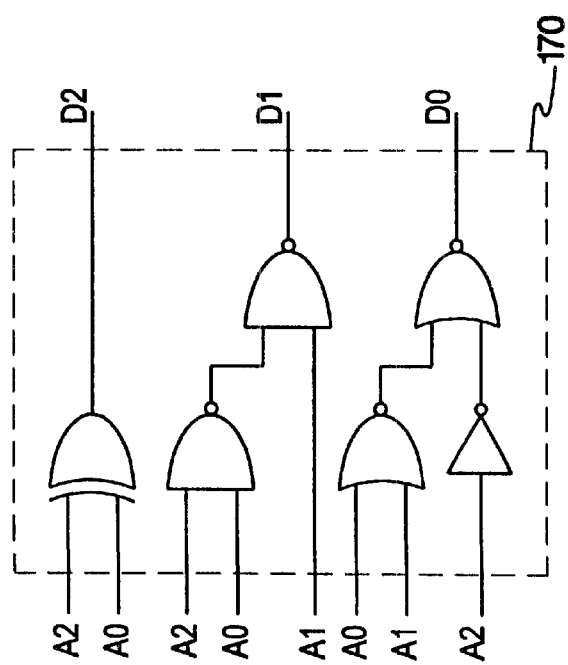
FIG. 2B. illustrates an exemplary storage element formed by using discrete logic available in standard cell or similar methodology.

FIG. 2B illustrates the preferred embodiment to implementing the storage elements when using standard cell or other logic based circuitry. To implement the storage element, a truth table 160 is formed using the address signals as inputs. The desired data outputs for each set of address inputs completes the logic truth table 160. For a standard cell or similar implementation, a logic compiler converts the truth table 160 to a set of logic equations and reduces this set of logic equations using Boolean logic to form the simplest logical equivalent that uses the least amount of transistors required to implement each output of the storage element. In many instances, the number of transistors required to implement this logic based storage element is less than the number of transistors used to implement a conventional ROM storage element. This reduction of transistors is primarily due to the elimination of the conventional address decoder, sense amplifiers, and output buffer circuits of the conventional ROM. Storage elements with logic gates have the additional advantage of being able to be implemented using conventional standard cell or equivalent layout programs. This advantage allows for reducing design time, test development and product cost.

In particular for FIG. 2B, a three bit input and a three bit output storage element, the reduced logic 170 to implement the truth table would require 24 transistors. A conventional ROM storage element would require 24 transistors for the memory core alone plus eight three-input NAND gates and three inverters (48 transistors using discrete logic gates) for the address decoder and three output buffers (at least 6 transistors). These additional transistors do not include the circuitry required to implement the sense amps for detecting the output of the memory core of the ROM. Therefore, the area required to implement the storage element can be reduced substantially.

Figure 3:
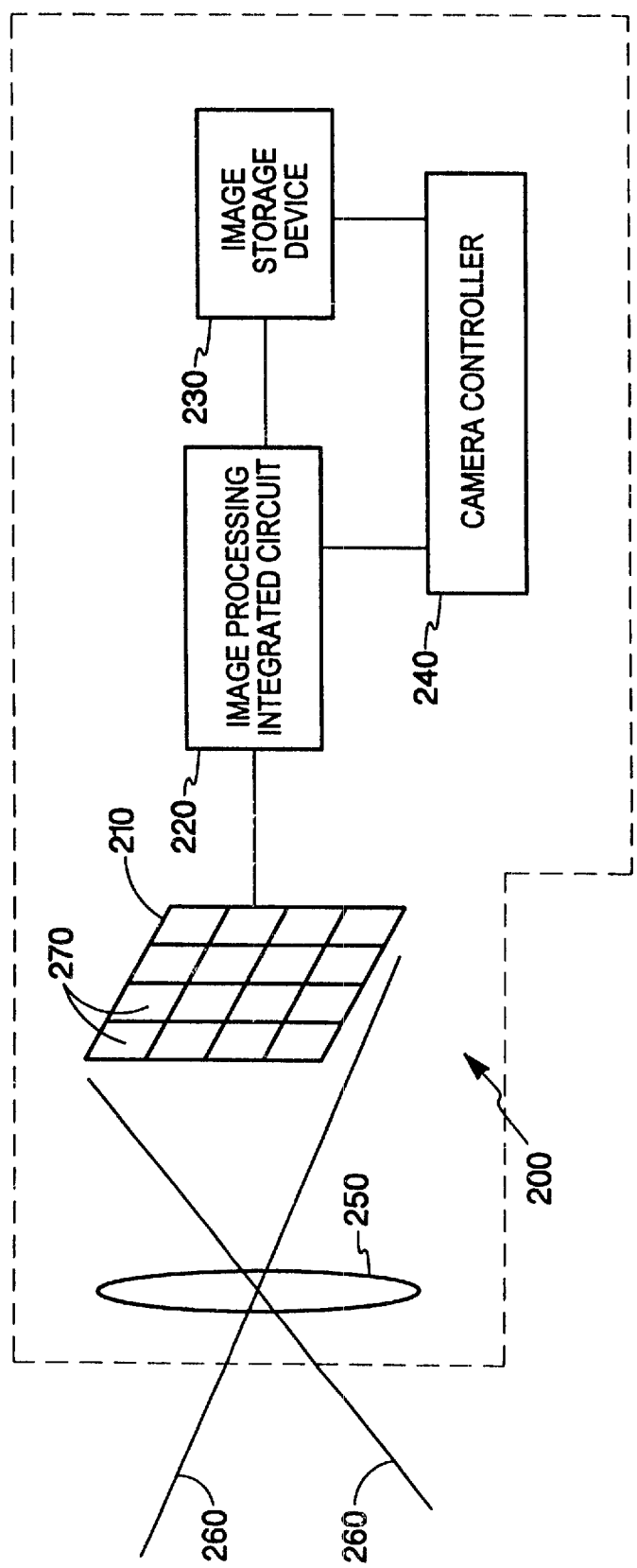
FIG. 3 illustrates the use of the preferred embodiment in a digital camera.

FIG. 3 illustrates a digital camera 200 (still, motion, or other image capturing devices such as a radar display, graphic material display, etc.) that uses the preferred embodiment of the invention to perform image compression and decompression. These image compression and decompression operations are generally performed using the discrete cosine transform (DCT) and inverse discrete cosine transform (IDCT), respectively, but other transforms, for example, fast Fourier transform and inverse fast Fourier transforms, respectively, are known to those skilled in the art and their use would still meet the spirit and scope of the invention. The coefficients of the matrix C for the DCT and IDCT are combined into two sets to form the partial sums stored in the storage elements 120 and are selected using the DCT/IDCT signal 140 as shown in FIG. 2 and FIG. 2A The digital camera 200 is comprised of a lens 250 that focuses electromagnetic energy 260 onto an image sensor 210 comprised of an array of pixels. The image sensor 210 pixels translate the electromagnetic energy 260 into electrical impulses that are coupled to a preferred embodiment of the invention, which is, itself, embodied in an image processing integrated circuit (IC) 220. The image sensor 210 is comprised of multiple smaller areas 270 (usually 8×8 or 16×16 pixels). The image processing IC 220 processes each smaller area 270 either for an image processing application (filtering, gamma correction, color balance, etc.) or for image compression / decompression using the DCT or IDCT partial sums in the storage elements. The image processing IC 220 is further coupled to a camera controller 240. The camera controller 240 is typically a microprocessor or a dedicated state machine. The camera controller 240 directs which smaller areas 270 of the image sensor 240 to process by the image processing IC 220. The camera controller 240 stores the results of image processing IC 220 in an image storage device 230. The image storage device 230 can be a Liquid Crystal Display (LCD), flash card, floppy disk, or other memory that provides an interface such as RS-232, SCSI, USB, or IEEE-1348 (firewire) for removal of the processed image by the user.

One advantage of this invention over conventional DA circuits is reduced integrated circuit area. Although the storage elements 120 in the new circuit require more locations than the conventional, the new method requires fewer two-addend adders than the conventional and does not require any output registers for storing the outputs for pipeline operation. The new method also does not require the registers used in the accumulators of the conventional DA circuit. If the storage elements 120 are implemented as logic based storage elements, and because logic based storage elements when implemented properly occupy relatively little space compared to the registers used in the adders of the conventional circuit, the new circuit layout is actually smaller than the conventional layout. In addition, further integrated circuit area reduction is achieved because the input registers 110 in the new circuit require fewer gates to implement than the parallel-in serial-out shift input registers 10 required by the conventional DA circuit. In an exemplary comparison, an 8×8 Discrete Cosine Transform (DCT) implemented using the conventional DA circuit required 9560 gates while implementing the same 8×8 DCT function using the new DA method of the invention requires fewer than 7500 gates. Each gate comprises typically four transistors.

Further, a second advantage of the new method can be useful in some situations. For example, the order of the output terms can be controlled very easily by controlling the upper address bits of the storage elements. The preferred embodiment shown in FIGS. 2 and 2A and described herein implies that these bits are controlled by a counter, but they can just as easily be driven in any arbitrary sequence to produce the desired output of the resultant elements of vector $\vec{Y}$.

What is claimed is:

1. An apparatus for computing an inner product vector of a matrix and a vector, the inner product vector having a set of elements, the matrix having a first set of coefficients arranged in a set of rows and a set of columns, the vector having a second set of coefficients, comprising:
   at least one input register, said at least one input register storing the second set of coefficients, said at least one input register having a set of outputs;
   a plurality of storage elements, said storage elements storing a set of partial sums derived from the first set of coefficients, said plurality of storage elements having a set of address inputs and a set of data outputs, said set of address inputs coupled to said set of outputs of said at least one input register, said a set of data outputs presenting a subset of said set of partial sums, said subset of said set of partial sums selected by said set of address inputs;

a select circuit, said select circuit coupled to said set of address inputs of said plurality of storage elements, said select circuit selecting a row in the matrix for computation of one element of said inner product vector from said selected row of the matrix and the vector;

an adder circuit, said adder circuit having a summation output and a plurality of addend inputs, said plurality of addend inputs coupled to said set of data outputs of said storage elements, wherein each data output of said plurality of storage elements is coupled to one addend input to form one addend of the summation output, said summation output presenting said one element of the inner product vector.

2. The apparatus of claim 1 further comprising a clock circuit, said clock circuit coupled to said at least one input register and said storage bank select circuit, said clock circuit creating a set of clock cycles corresponding to the number of rows of the matrix, and wherein said adder circuit presents said one element of the inner product vector corresponding to said selected row of the matrix multiplied by the vector for each clock cycle of said set of clock cycles.

3. The apparatus of claim 1, wherein said apparatus is fabricated as an integrated circuit.

4. The apparatus of claim 1, wherein said plurality of storage elements store multiple sets of partial sums, and said plurality of storage elements further comprise a selector, said selector coupled to said plurality of storage elements to select that set of partial sums to be presented on said data outputs of said plurality of storage elements.

5. The apparatus of claim 4, wherein said selector selects a set of partial sums which allows the apparatus to perform a discrete cosine transform.

6. The apparatus of claim 4, wherein said selector selects a set of partial sums which allows the apparatus to perform an inverse discrete cosine transform.

7. The apparatus of claim 1, wherein said plurality of storage elements is comprised of at least one read only memory and wherein said set of partial sums derived from the first set of coefficients is static.

8. The apparatus of claim 7 wherein said at least one read only memory is comprised of logic based elements.

9. The apparatus of claim 1, wherein said plurality of storage elements is comprised of at least one random access memory and wherein said set of partial sums derived from the first set of coefficients is dynamically updated.

10. An image encoder comprising the apparatus of claim 1.

11. An image decoder comprising the apparatus of claim 1.

12. An image processing device comprising the apparatus of claim 1.

13. A digital camera comprising the apparatus of claim 1.

14. A method for computing an inner product vector of a matrix and a vector, the matrix having a first set of coefficients arraigned in a set of rows and a set of columns, the vector having a second set of coefficients, comprising the steps of:

generating a set of register outputs from the second coefficients of the vector;

storing a set of pre-calculated partial sums derived from the first coefficients in a plurality of storage elements;

selecting a matrix row to be multiplied with the vector to form a portion of the inner product vector;

selecting a subset of pre-calculated partial sums from said stored set of pre-calculated partial sums based on said set of register outputs into said plurality of storage elements;

adding said subset of pre-calculated partial sums in said adder circuit to create said portion of the inner product; and repeating the steps of selecting a matrix row, selecting a subset of pre-calculated partial sums, and adding said subset or pre-calculated partial sums for each row of the matrix.

15. The method of claim 14, wherein said step of selecting a subset of pre-calculated partial sums comprises the step of selecting from multiple sets of pre-calculated partial sums.

16. The method of claim 15, wherein said step of selecting from multiple sets of pre-calculated partial sums comprises the step of selecting a set of pre-calculated partial sums adapted to perform a discrete cosine transform.

17. The method of claim 15, wherein the step of selecting from multiple sets of pre-calculated partial sums comprises the step of selecting a set of pre-calculated partial sums adapted to perform an inverse discrete cosine transform.

18. The method of claim 14, further comprising the step of writing said plurality of storage elements with a set of pre-calculated partial sums.

19. An image processing device using the method of claim 14.

20. A digital camera using the method of claim 14.

21. A digital camera, comprising:

a lens;

an image sensor, said image sensor having an image capture area optically coupled to said lens, and said image sensor having a data output;

an image processing integrated circuit, said image processing integrated circuit coupled to said data output of said image sensor, said image processing integrated circuit further comprising, a circuit for computing a set of inner product results of a matrix and a vector, the matrix having a first set of coefficients arranged in a set of rows and a set of columns, the vector having a second set of coefficients derived from said image sensor, and further comprising, a plurality of input registers, said plurality of input registers storing the second set of coefficients, said plurality of input registers having a set of outputs, a plurality of storage elements, said storage elements storing a set of partial sums derived from the first set of coefficients, said plurality of storage elements having a set of address inputs and a set of data outputs, said set of address inputs coupled to said set of outputs of said plurality of input registers, said plurality of storage elements having a set of data outputs for presenting a subset of said set of partial sums, said subset of said set of partial sums selected by said set of address inputs, a storage bank select circuit, said storage bank select circuit coupled to said set of address inputs of said plurality of storage elements, said storage bank select circuit selecting a row in the matrix to compute one inner product result from the selected row and the vector, a clock circuit, said clock circuit coupled to said plurality of input registers and said storage bank select circuit, said clock circuit creating a set of clock cycles corresponding to the number of rows of the matrix, and an adder circuit, said adder circuit having a summation output and a plurality of addend inputs, said plurality of addend inputs coupled to said set of data outputs of said storage elements, wherein each data output of said plurality of storage elements is coupled to one addend input to form one addend of the summation output, said summation output presents one inner product result of the set of inner product results corresponding to a row of the matrix multiplied by the vector for each clock cycle of said set of clock cycles;

a camera controller, said camera controller coupled to said summation output of said image processing integrated circuit, said camera controller creating an image processed data output; and a image storage device, said image storage device coupled to said camera controller, said image storage device storing the image processed data output from said camera controller.

\* \* \* \* \*